United States Patent
Dunn

(10) Patent No.: US 10,580,198 B2
(45) Date of Patent: Mar. 3, 2020

(54) SYSTEM AND METHOD FOR OPTIMIZED SPARSE VOLUME RENDERING

(71) Applicant: Nvidia Corporation, Santa Clara, CA (US)

(72) Inventor: Alex Dunn, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 583 days.

(21) Appl. No.: 14/942,391

(22) Filed: Nov. 16, 2015

(65) Prior Publication Data

US 2017/0140569 A1 May 18, 2017

(51) Int. Cl.
*G06T 15/08* (2011.01)
*G06T 15/06* (2011.01)
*G06T 15/00* (2011.01)
*G06T 1/20* (2006.01)
*G06T 17/20* (2006.01)

(52) U.S. Cl.
CPC .............. *G06T 15/08* (2013.01); *G06T 1/20* (2013.01); *G06T 15/005* (2013.01); *G06T 15/06* (2013.01); *G06T 17/20* (2013.01)

(58) Field of Classification Search
CPC ................................ G06T 15/08; G06T 15/06
See application file for complete search history.

(56) References Cited

U.S. PATENT DOCUMENTS

2012/0194644 A1* 8/2012 Newcombe ............... G06T 7/74
348/46
2016/0042552 A1* 2/2016 McNabb ............... G06T 15/005
345/424

OTHER PUBLICATIONS

Ronald Fedkiw, Jos Stam, and Henrik Wann Jensen. 2001. Visual simulation of smoke. In Proceedings of the 28th annual conference on Computer graphics and interactive techniques (SIGGRAPH '01). ACM, New York, NY, USA, 15-22. DOI: https://doi.org/10.1145/383259.383260.*
Crane, K., et al., "Real-Time Simulation and Rendering of 3D Fluids," NVIDIA GPU Gems 3, 2008, 44 pages.
Dunn, A., et al., "Transparency (or Translucency) Rendering," GameWorks Blog, Oct. 20, 2014, 8 pages.
Engel, K., et al., "Early Ray Termination," Real-Time Volume Graphics, 2006, pp. 200-206.
Green, S., "Volume Rendering For Games," Game Developers Conference, Mar. 7-11, 2005, 28 pages, San Francisco, CA.
Pawasauskas, J., "Volume Visualization with Ray Casting," CS563—Advanced Topics in Computer Graphics, Feb. 18, 1997, 15 pages.
Wexler, D., et al. "GPU-Accelerated High-Quality Hidden Surface Removal," Graphics Hardware 2005, The Eurographics Association, 8 pages.

* cited by examiner

*Primary Examiner* — Phi Hoang

(57) ABSTRACT

A system and method of rendering a fluid-like object in a volume space are provided. In one embodiment, the method includes: (1) determining a list of bricks in the volume space that the fluid-like object would occupy, (2) grouping the bricks into buckets based on depth values of the bricks and (3) rendering each of the buckets separately.

18 Claims, 2 Drawing Sheets

SYSTEM AND METHOD FOR OPTIMIZED SPARSE VOLUME RENDERING

TECHNICAL FIELD

This application is directed, in general, to volume rendering and, more specifically, to optimized sparse volume rendering using traditional rasterization hardware.

BACKGROUND

Volume rendering is a set of techniques used to display a two-dimensional (2D) projection of a three-dimensional (3D) discretely sampled data set. One of the techniques used for volume rendering is ray-marching, which blends a collection of samples taken from a data set at a fixed step along each screen pixel's view-ray. Ray-marching produces accurate renditions and promises to remain a viable technique for volume rendering for the foreseeable future.

SUMMARY

One aspect provides an embodiment of a method for rendering a fluid-like object in a volume space. The method includes determining a list of bricks in the volume space that the fluid-like object would occupy; grouping the bricks into buckets based on depth values of said bricks; and rendering each of said buckets separately.

Another aspect provides an embodiment of a system for rendering a fluid-like object in a volume space. The system includes a Central Processing Unit (CPU) configured to determine a list of bricks that the fluid-like object would occupy, and a Graphics Processing Unit (GPU) configured to group the bricks into multiple buckets based on depth values of the bricks and render each of the buckets separately.

BRIEF DESCRIPTION

Reference is now made to the following descriptions taken in conjunction with the accompanying drawings, in which.

DETAILED DESCRIPTION

As stated above, one of the techniques that has been used for volume rendering is ray-marching. However, it is realized herein that this approach is wasteful as applied to fluid simulation and rendering, in that many of the samples collected while traversing a screen pixel's view-ray ultimately do not contribute to the final color of the pixel. In other words, samples are often collected from regions in volume space that do not contain the fluid or are not visible behind opaque primitives.

Introduced herein is a sparse volume rendering technique that skips over the samples that do not contribute to the final outcome of rendering fluid-like object. For this technique, the volume space is subdivided into multiple regions called bricks, each of which is made up of neighboring cells in the volume space. By running an extrapolation algorithm based on the physics of fluid with the simulation data of past frames, the technique determines a list of bricks that would be occupied by fluid and collect samples from only those bricks for rendering.

It is realized herein that skipping over those samples that do not contribute to the final outcome of the rendering may result in not only a more efficient, but faster volume rendering. However, it is also realized herein that an optimization technique such as early-ray termination cannot be used with the above volume rendering technique. This is because while early-ray termination can be performed within a brick, it cannot be extended to cover the whole volume space since each brick is ray marched separately.

For this reason, a novel optimization technique called "bucket opacity thresholding" is introduced herein. According to the bucket opacity thresholding, the bricks that the simulation object would occupy are grouped into multiple buckets based on the bricks' depth values. As the buckets are rendered individually based on their depth values (e.g., in a front-to-back order), pixels in each bucket that further rendering would have no effect (e.g., opaque pixels) can be safely discarded after rendering each bucket, achieving another level of samples elimination to already efficient, sparse volume rendering.

Figure 1:
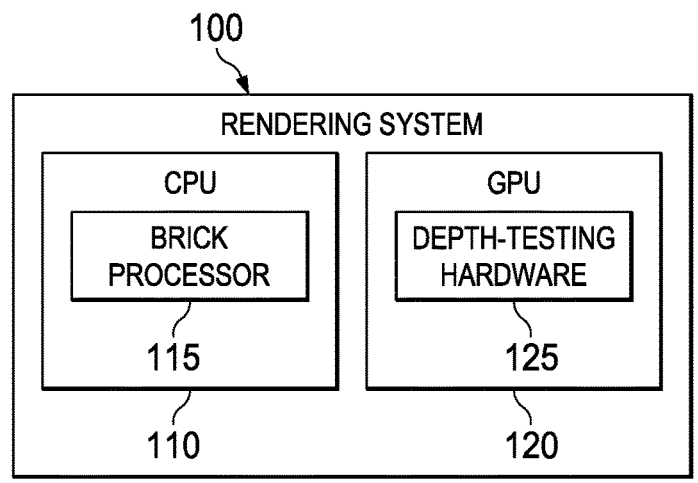
FIG. 1 is a block diagram of one embodiment of a system for rendering a fluid-like object, e.g., liquid, smoke and fire, in a volume (3D) space.

FIG. 1 is a block diagram of one embodiment of a system 100 for rendering a fluid-like object, e.g., liquid, smoke and fire, in a volume (3D) space. The volume space is divided into a plurality of bricks, each of which includes a plurality of neighboring cells. Each brick corresponds to a different tile of volume tiled resources.

In the illustrated embodiment, the system 100 includes a Central Processing Unit (CPU) 110 and a Graphic Processing Unit (GPU) 120. The CPU 110 includes a brick processor 115 configured to determine a list of bricks the fluid-like object would occupy. In the illustrated embodiment, the list of bricks is determined by performing an extrapolation algorithm that is based on the physics of fluid using past simulation data. In the illustrated embodiment, only those bricks in the list are mapped to a memory (not shown) of the GPU 120 using respective tiles of the volume tile resources.

In the illustrated embodiment, the GPU 120 is configured to group the bricks in the list into multiple buckets based on a depth value of each brick. In one embodiment, each bucket has a minimum and maximum depth/z value; any brick that falls into that range is said to be within the bucket. In another embodiment, the bricks are sorted based on their depth values before grouping.

In the illustrated embodiment, the GPU 120 is further configured to render the buckets. In one embodiment, the buckets are rendered in a front-back order using an under blend operator. In one embodiment, the buckets are rendered in the front-back order based on the defined forward direction and a depth/z value of the buckets, e.g., an average value of bricks in each bucket.

In the illustrated embodiment, each bucket is rendered separately. In one embodiment, each bucket is rendered by ray marching each brick individually. Ray marching is performed through each brick's bounding box just as would be done for the bounding box of a regular (non-bricked) volume. In one embodiment, each brick is rendered using a simple box primitive transformed to the position, rotation and scale of each brick.

Parameters for ray marching, e.g. a ray direction and ray intersections, are calculated and passed from a vertex shader and a pixel shader. Those skilled in the pertinent art will understand that the position of faces of the bounding box should not be used as either the start or end location of ray marching, as this will tend to introduce sorting artifacts. However, face positions can be used to determine the ray direction, which can be then used in conjunction with a simple ray-box intersection test to determine the start and end locations for ray marching.

For each marching step, samples are collected from the respective tile of the volume tiled resource. Sampling from the volume tiled resource is the same as sampling from a regular volume texture in High Level Shading Language (HLSL).

In the illustrated embodiment, the GPU 120 includes depth-testing hardware 125. The depth-testing hardware 125 is configured to check a transmittance value of every pixel in each rendered the bucket. The depth-testing hardware 125 is further configured to discard pixels that have reached a threshold transmittance value from further rendering, i.e. rendering of subsequent buckets. In the illustrated embodiment, the threshold transmittance value is set at or close to 0, so that only those pixels that do not substantially contribute to the final outcome of the rendering are safely discarded. In one embodiment, the depth-testing hardware 125 runs a full-screen pass to check the transmittance values of pixels in each rendered bucket.

Figure 2:
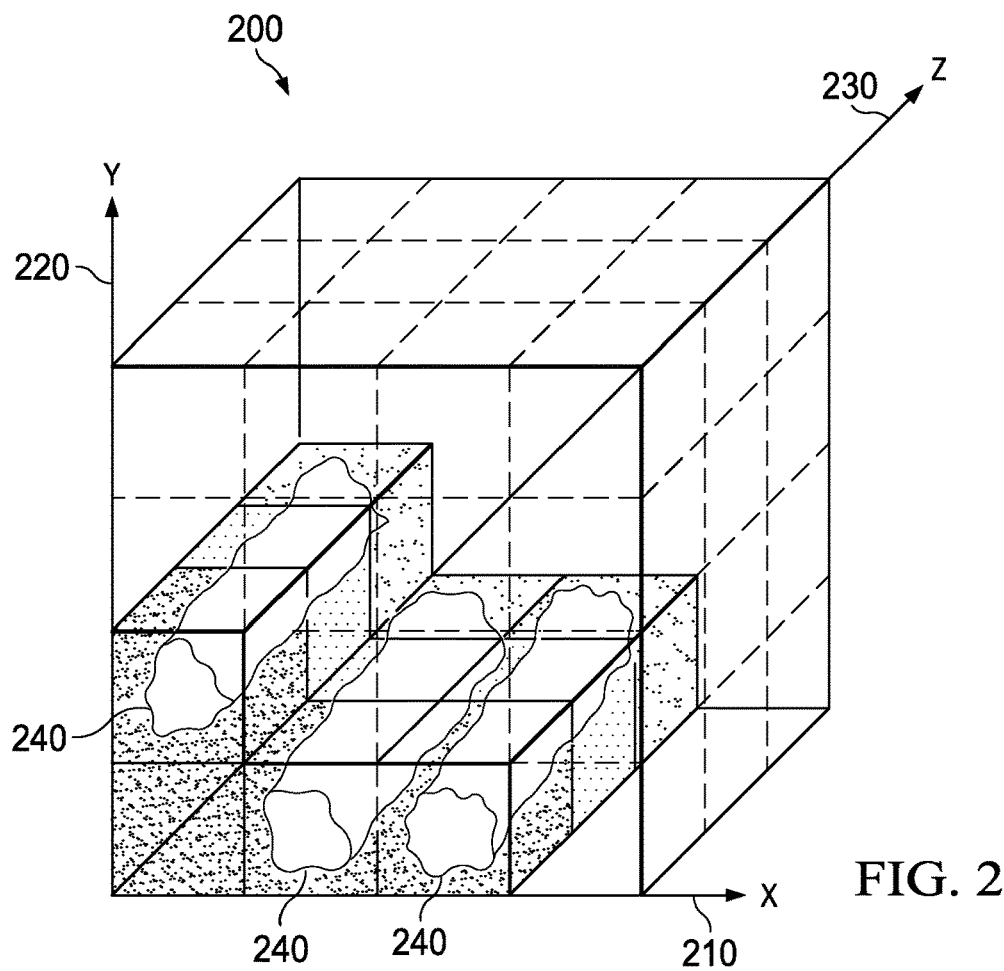
FIG. 2 is a diagram of one embodiment of a volume (3D) space having grouped bricks.

FIG. 2 is a diagram of one embodiment of a volume space 200 having a simulation object 240 overlaid with grouped bricks. The volume space 200 has X-axis 210, Y-axis 220, and Z-axis 230, representing width, height and depth of the volume space 200, respectively. In the illustrated embodiment, the volume space 200 is divided into forty-eight (48) bricks, each of which including a plurality of neighboring cells. Each brick corresponds to a different tile of volume tiled resources that is mapped to a portion of a GPU memory. It is understood that the number of bricks in each axis in the illustrated embodiment is exemplary and subject to change based on a preferred rendering granularity.

In the illustrated embodiment, it is determined, for example, that the simulation object 240 would occupy only twelve (12) shaded bricks for a given frame. Accordingly, only those twelve bricks are mapped to the GPU memory using the volume tile resources. As such, any samples needed in ray marching those bricks would be collected from respective tiles of the volume tiled resources.

In one embodiment, a virtual table that keeps track of the mapping between the GPU memory and the bricks is maintained in hardware. This allows samples needed in ray marching to be collected from the respective tiles of the volume tiled resources using hardware translation. In an alternative embodiment, software indirections are employed.

In the illustrated embodiment, the twelve bricks are grouped into three different buckets based on their depth/z values. Each bucket is shaded in different pattern for differentiation. This depth/z value based grouping allows when these buckets are rendered in a front-to-back order, pixels in each bucket that do not contribute to the final outcome of the rendering to be safely checked and discarded from rendering of other subsequent buckets.

Figure 3:
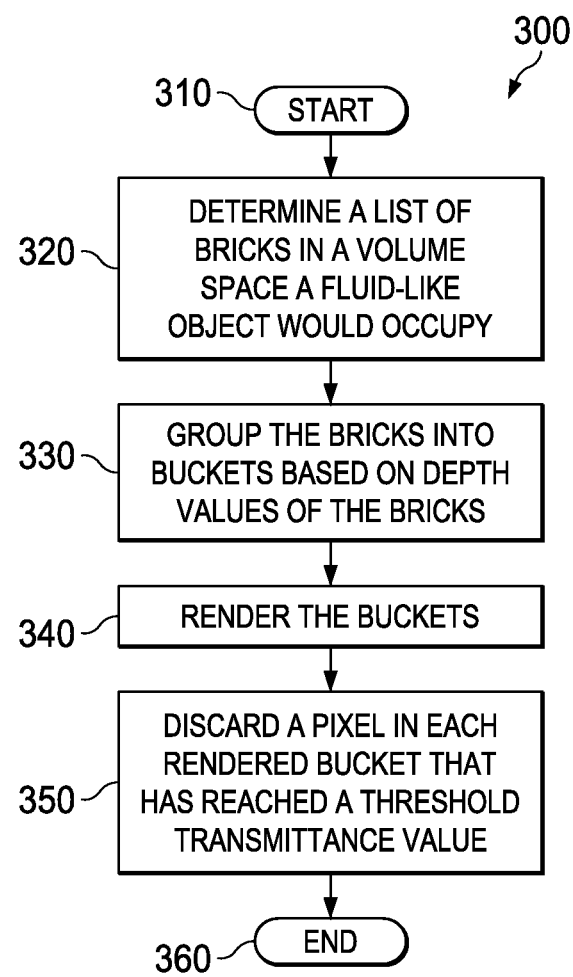
FIG. 3 is a flow diagram of one embodiment of a method for rendering a fluid-like object, e.g. liquid, smoke and fire, in a volume (3D) space.

FIG. 3 is a flow diagram of one embodiment of a method 300 for rendering a fluid-like object, e.g. liquid, smoke and fire, in a volume (3D) space. The volume space is divided into a plurality of bricks, each of which includes a plurality of neighboring cells. Each brick corresponds to each different tile of volume tiled resources that is mapped to each different portion of a GPU memory. The method begins in a start step 310.

In a step 320, a list of bricks in the volume space that the fluid-like would occupy is determined. In one embodiment, the list of bricks is determined using an extrapolation algorithm based on the physics of fluid with the simulation data of past frames. In such an embodiment, a CPU determines the list.

In a step 330, the bricks in the list are grouped into buckets based on their depth/z values. Each bucket has a minimum and maximum depth/z value and any brick that falls into that range is said to be within the bucket. In one embodiment, the bricks are sorted based on their depth values before grouping.

In a step 340, the buckets are rendered. In the illustrated embodiment, each of the buckets is rendered individually by a separate draw calls. The buckets are rendered in a front-back order using an under blend operator. In one embodiment, the buckets are rendered in the front-back order based on the defined forward direction and a depth/z value of the buckets, e.g., an average value of bricks in each bucket.

For each bucket, every brick is ray marched individually. Each brick is ray marched through its bounding box just as would be done for the bounding box of a regular (non-bricked) volume. A ray direction is calculated and passed from a vertex shader and ray intersections are calculated by a pixel shader. In one embodiment, the pixel shader performs the ray marching.

After rendering each bucket, a transmittance value of every pixel in each rendered bucket is checked using a full-screen pass. In one embodiment, the transmittance value is stored at the alpha channel of each pixel in the render target that is used to render each bucket.

After checking, in a step 350, pixels in each rendered bucket that have reached a threshold transmittance value are discarded from further rendering, i.e. rendering of other buckets. In the illustrated embodiment, the threshold transmittance value is set at 0 or close to 0. In one embodiment, for those pixels that have reached the threshold transmittance value, a 0 or minimum-z value is written to their respective locations in a depth buffer. This allows those pixels to be effectively discarded by the depth-testing hardware. In another embodiment, instead of the depth buffer, a stencil buffer may be used. The method ends in an end step 360.

Those skilled in the art to which this application relates will appreciate that other and further additions, deletions, substitutions and modifications may be made to the described embodiments.

What is claimed is:

1. A method for rendering a fluid-like object in a volume space, comprising:
   determining a list of bricks in said volume space said fluid-like object would occupy;
   grouping said bricks into buckets based on depth values of said bricks;
   rendering each of said buckets separately; and
   after rendering said each bucket, discarding a pixel in said each bucket that has reached a threshold transmittance value.

2. The method as recited in claim 1, wherein said rendering includes rendering said buckets in a front-to-back order.

3. The method as recited in claim 1, wherein said rendering includes ray marching each brick in said buckets individually.

4. The method as recited in claim 1, wherein said ray marching is performed using a pixel shader.

5. The method as recited in claim 1, wherein said bricks are mapped to a memory of a Graphics Processing Unit (GPU) using volume tiled resources.

6. The method as recited in claim 1, wherein said rendering includes collecting samples from volume tiled resources corresponding to said bricks using a hardware translation.

7. The method as recited in claim 1, wherein said rendering is performed using an under blend operator.

8. The method as recited in claim 1, further comprising after rendering said each bucket, running a full-screen pass to check a transmittance value of every pixel in said each bucket.

9. The method as recited in claim 1, wherein said pixel is opaque.

10. A system for rendering a fluid-like object in a volume space, comprising:
 a Central Processing Unit (CPU) configured to determine a list of bricks said fluid-like object would occupy;
 a Graphics Processing Unit (GPU) configured to group said bricks into multiple buckets based on depth values of said bricks and render each of said buckets separately; and
 wherein said GPU includes a depth-testing hardware configured to discard a pixel in said each bucket that has reached a threshold transmittance value after rendering said each bucket.

11. The system as recited in claim 10, wherein said bricks are rendered in a front-to-back order.

12. The system as recited in claim 10, wherein said buckets are rendered by ray marching each brick in said buckets individually.

13. The system as recited in claim 12, wherein said ray marching is performed using a pixel shader.

14. The system as recited in claim 10, wherein said bricks are mapped to a memory of said GPU using volume tiled resources.

15. The system as recited in claim 10, wherein samples are collected from volume tiled resources corresponding to said bricks using a hardware translation.

16. The system as recited in claim 10, wherein said buckets are rendered using an under blend operator.

17. The system as recited in claim 10, wherein said depth-testing hardware is further configured to run a full-screen pass to check a transmittance value of every pixel in said each bucket after rendering said each bucket.

18. The system as recited in claim 10, wherein said pixel is opaque.

* * * * *